United States Patent Office 3,028,436
Patented Apr. 3, 1962

3,028,436
CONDENSATION OF CHLOROBENZENE AND FORMALDEHYDE TO POLYMERIC OILS
John W. Schick, Delaware Township, Camden County, N.J., assignor to Socony Mobil Oil Company, Inc., a corporation of New York
No Drawing. Filed Nov. 3, 1959, Ser. No. 850,510
4 Claims. (Cl. 260—649)

This invention is concerned with the condensation of aromatic compounds with formaldehyde. It is more particularly concerned with a process for condensing chlorobenzene and formaldehyde to form, almost exclusively, polymer oils.

As is well known to those familiar with the art, it has been proposed to condense aromatic hydrocarbons, such as benzene, or phenols with formaldehyde to produce high molecular weight resinous materials. Generally, acidic clay catalysts have been sufficient. In the case of chlorobenzene as the aromatic compound reactant, however, the condensation with formaldehyde appears to be hindered so that yields are relatively low, in the presence of clay catalysts. The use of more drastic catalysts and conditions leads to the formation of resinous products for the most part.

Oily low molecular weight polymers of chlorobenzene and formaldehyde are highly desirable as special solvents, as insecticides, and as secondary plasticizers for polyvinylchloride resins. Particularly suitable oils would be mixtures of bis(chlorophenyl) methane ("dimer") and bis(chlorobenzyl) chlorobenzene ("trimer"). In this connection it is highly desirable to be able to produce such a mixture of dimer and trimer to the substantial exclusion of higher molecular weight, resinous products.

It has now been found that an oily polymer can be made simply and economically. It has been discovered that chlorobenzene and formaldehyde can be condensed to produce a mixture of dimer and trimer to the substantial exclusion of higher molecular weight and resinous product.

Accordingly, it is a broad object of this invention to provide a process for producing useful polymer oils. Another object is to provide a process for condensing chlorobenzene and formaldehyde to produce an oily polymer with low production of resinous polymer. A specific object is to provide a process for producing a mixture of bis(chlorophenyl) methane and bis(chlorobenzyl) chlorobenzene to the substantial exclusion of higher molecular weight, resinous polymers. Other objects and advantages of this invention will become apparent to those skilled in the art from the following detailed description.

In general, the present invention provides a process for producing a polymer oil, that comprises reacting formaldehyde with chlorobenzene, in a weight ratio of formaldehyde to chlorobenzene varying between about 0.08 and about 0.2; in the presence of sulfuric acid catalyst, the acid strength of said sulfuric acid being at least 80 percent $H_2SO_4$ by weight, and the weight ratio of said sulfuric acid to chlorobenzene varying between about 0.1 and about 0.4; at a temperature varying between about 60° C. and about 130° C.; and for a period of time varying between about one hour and about 6 hours.

THE REACTANTS

The reactants used in the process of this invention are chlorobenzene and formaldehyde. Chlorobenzene (monochlorobenzene or phenyl chloride) is a well known compound that is readily available commercially. It can be used in technical grade, but substantially pure chlorobenzene is preferred. Chlorobenzene is produced by methods well known in the art, such as by catalytic chlorination of benzene.

The formaldehyde reactant can be the polymeric formaldehyde, paraform (paraformaldehyde) or in the form of the cyclic trimer, trioxane. More dilute solutions of formaldehyde, such as formalin, are less desirable, because they tend to dilute the acid strength of the sulfuric acid catalyst. Formaldehyde in its various forms is well known and readily available commercially.

STANDARD RUN PROCEDURE

In all the runs described and discussed herein, the following standard procedure was used:

A mixture of paraformaldehyde and chlorobenzene, in the desired weight ratio was placed in a reaction vessel. The sulfuric acid catalyst was added to this mixture at a rate whereby the temperature of the reaction mixture was maintained below 60° C. After all the surfuric acid catalyst had been added, the temperature of the reaction mixture was raised to the desired run temperature (usually 100–130° C.) and maintained at that level for the desired reaction time. After the reaction time, the reaction mixture was permitted to stand to settle into two layers. The lower, acid layer was removed and the organic layer was filtered through filtering clay to remove residual acid and water. Then, the organic layer was subjected to distillation. Unreacted chlorobenzene was stripped, and the remainder of the organic layer was fractionated into three fractions, namely, cut I (or "dimer") the bis(chlorophenyl) methane-B.P. 640–660° F.; cut II (or "trimer") the bis(chlorobenzyl) chlorobenzene-B.P. 850–870° F.; and a higher boiling resinous higher polymer.

EFFECT OF REACTION TEMPERATURE

Examples 1 Through 7

Using the standard run procedure, a series of runs, at several catalyst concentrations, were made in which the temperature was varied. The pertinent run data and yields of these runs are set forth in Table I.

TABLE I

| Example | Charge, grams | | | | | Temp., °C. | Time, hrs. | Yield, grams | | | | Yield, weight percent chlorobenzene |
|---|---|---|---|---|---|---|---|---|---|---|---|---|
| | Chlorobenzene | $H_2SO_4$ | Weight ratio | Paraform | Weight ratio | | | Cut 1 | Cut 2 | Residue | Total | |
| 1 | 500 | 50 | 0.10 | 60 | 0.12 | 100 | 3 | 134 | 41 | 5 | 180 | 36.0 |
| 2 | 500 | 50 | 0.10 | 60 | 0.12 | 130 | 3 | 147 | 47 | 16 | 210 | 42.0 |
| 3 | 500 | 100 | 0.20 | 60 | 0.12 | 60 | 5 | 146 | 33 | 44 | 223 | 44.6 |
| 4 | 500 | 100 | 0.20 | 60 | 0.12 | 100 | 3 | 115 | 55 | 33 | 203 | 40.6 |
| 5 | 500 | 100 | 0.20 | 60 | 0.12 | 130 | 3 | 148 | 55 | 17 | 220 | 44.0 |
| 6 | 500 | 200 | 0.40 | 60 | 0.12 | 100 | 3 | 145 | 64 | 23 | 232 | 46.4 |
| 7 | 500 | 200 | 0.40 | 60 | 0.12 | 130 | 3 | 169 | 52 | 21 | 242 | 48.4 |

From the data in Table I, it will be noted that good yields dimer and trimer product are obtained at temperatures of 100–130° C. The upper limit of the temperature range is set by the reflux temperature of chlorobenzene (132° C.). Good yields of product were obtained, however, at 60° C. (Example 3) using a compensating longer reaction time, although somewhat more higher polymer was produced. Accordingly, the process of this invention can be carried out at temperatures varying between about 60° C. and about 130° C. Preferred reaction temperatures are between about 100° C. and about 130° C.

EFFECT OF REACTION TIME
*Examples 8 Through 14*

Using the standard run procedure, series of runs were made at the preferred temperatures, but using various reaction times. Pertinent run data and yields of these runs are set forth in Table II. For purposes of completing the time comparison, data for Examples 1 and 4 are also included in Table II.

CATALYST TO CHLOROBENZENE RATIO
*Examples 15 Through 17*

Using the standard run procedure, a series of runs were made at 100° C. and at 130° C. In these runs, the amount of sulfuric acid catalyst (98 percent $H_2SO_4$) was varied to afford a variation of catalyst to cholorbenzene weight ratio. Pertinent run data and yields of these runs are set forth in Table III. For comparison, data for Examples 1, 2, 6, and 14 are also set forth in Table III.

TABLE III

| Example | Charge, grams | | | | | Temp., ° C. | Time, hrs. | Yield, grams | | | | Yield, weight percent chlorobenzene |
|---|---|---|---|---|---|---|---|---|---|---|---|---|
| | Chlorobenzene | $H_2SO_4$ | Weight ratio | Paraform | Weight ratio | | | Cut 1 | Cut 2 | Residue | Total | |
| 15 | 500 | 25 | 0.05 | 60 | 0.12 | 100 | 3 | 51 | 19 | 3 | 73 | 14.6 |
| 1 | 500 | 50 | 0.10 | 60 | 0.12 | 100 | 3 | 134 | 41 | 5 | 180 | 36.0 |
| 16 | 500 | 75 | 0.15 | 60 | 0.12 | 100 | 3 | 170 | 52 | 14 | 236 | 47.2 |
| 17 | 500 | 125 | 0.25 | 60 | 0.12 | 100 | 3 | 152 | 55 | 23 | 230 | 46.0 |
| 6 | 500 | 200 | 0.40 | 60 | 0.12 | 100 | 3 | 145 | 65 | 23 | 228 | 45.6 |
| 2 | 500 | 50 | 0.10 | 60 | 0.12 | 130 | 3 | 147 | 47 | 16 | 210 | 42.0 |
| 14 | 500 | 100 | 0.20 | 60 | 0.12 | 130 | 4 | 205 | 78 | 12 | 295 | 59.0 |
| 7 | 500 | 200 | 0.40 | 60 | 0.12 | 130 | 3 | 169 | 52 | 21 | 242 | 48.4 |

From the data in Table III, it will be noted that yields increase with increased catalyst-chlorobenzene weight ratio to a maximum yield at 100° C. at a ratio of about 0.15, and at 130° C. at a ratio of about 0.20. In general,

TABLE II

| Example | Charge, grams | | | | | Temp., ° C. | Time, hrs. | Yield, grams | | | | Yield, weight percent chlorobenzene |
|---|---|---|---|---|---|---|---|---|---|---|---|---|
| | Chlorobenzene | $H_2SO_4$ | Weight ratio | Paraform | Weight ratio | | | Cut 1 | Cut 2 | Residue | Total | |
| 8 | 500 | 50 | 0.10 | 60 | 0.12 | 100 | 1.5 | 120 | 39 | 6 | 165 | 33.0 |
| 1 | 500 | 50 | 0.10 | 60 | 0.12 | 100 | 3 | 134 | 41 | 5 | 180 | 36.0 |
| 9 | 500 | 50 | 0.10 | 60 | 0.12 | 100 | 6 | 108 | 41 | 14 | 163 | 32.6 |
| 4 | 500 | 100 | 0.20 | 60 | 0.12 | 100 | 3 | 115 | 55 | 33 | 203 | 40.6 |
| 10 | 500 | 100 | 0.20 | 60 | 0.12 | 100 | 1 | 146 | 52 | 29 | 227 | 45.4 |
| 11 | 500 | 100 | 0.20 | 60 | 0.12 | 100 | 6 | 178 | 68 | 49 | 295 | 59.0 |
| 5 | 500 | 100 | 0.20 | 60 | 0.12 | 130 | 3 | 148 | 55 | 17 | 220 | 44.0 |
| 12 | 500 | 100 | 0.20 | 60 | 0.12 | 130 | 1 | 136 | 58 | 20 | 214 | 42.8 |
| 13 | 500 | 100 | 0.20 | 60 | 0.12 | 130 | 4 | 205 | 78 | 12 | 295 | 59.0 |
| 14 | 500 | 100 | 0.20 | 60 | 0.12 | 100 | 24 | 150 | 33 | 43 | 226 | 45.2 |

From the data in Table II, it will be noted that maximum conversion of chlorobenzene (59.0 percent) at 100° C. occurred in about 6 hours reaction time. The same maximum conversion was reached in about 4 hours at 130° C. Further increase of time of reaction at lower temperatures (e.g., Example 14) appears not to increase yield and tends to increase formation of higher polymer. From the standpoint of maximum yield of dimer and trimer with minimum production of higher polymers, the preferred operation calls for a higher temperature and shorter reaction time, such as, 130° C. for 3-4 hours. In general, the time of reaction, correlated indirectly with temperature, will vary between about one hour and about 6 hours, and preferably between about 3 hours and about 6 hours.

the catalyst to chlorobenzene weight ratio will be between about 0.10 and about 0.40, and preferably between about 0.10 and about 0.25.

FORMALDEHYDE CONCENTRATION
*Examples 18 Through 25*

Using the standard run procedure, a series of runs was made at 100° C. and 130° C., using catalyst-chlorobenzene weight ratios of 0.10 and 0.20. In these runs, the amount of paraform was varied to give a range of formaldehyde to chlorobenzene weight ratios. Pertinent run data and results of these runs are set forth in Table IV. For comparison, data for Examples 1, 2, 4, and 14 are also set forth in Table IV.

TABLE IV

| Example | Charge, grams | | | | | Temp., ° C. | Time, hrs. | Yield, grams | | | | Yield, weight percent chlorobenzene |
|---|---|---|---|---|---|---|---|---|---|---|---|---|
| | Chlorobenzene | $H_2SO_4$ | Weight ratio | Paraform | Weight ratio | | | Cut 1 | Cut 2 | Residue | Total | |
| 18 | 500 | 50 | 0.10 | 33 | 0.066 | 100 | 3 | 78 | 33 | 12 | 123 | 24.6 |
| 19 | 500 | 50 | 0.10 | 48 | 0.096 | 100 | 3 | 119 | 45 | 11 | 175 | 35.0 |
| 1 | 500 | 50 | 0.10 | 60 | 0.12 | 100 | 3 | 134 | 41 | 5 | 180 | 36.0 |
| 20 | 500 | 100 | 0.20 | 33 | 0.066 | 100 | 3 | 98 | 45 | 20 | 163 | 32.6 |
| 4 | 500 | 100 | 0.20 | 60 | 0.12 | 100 | 3 | 115 | 55 | 33 | 203 | 40.6 |
| 21 | 500 | 100 | 0.20 | 75 | 0.15 | 100 | 3 | 173 | 61 | 17 | 251 | 50.2 |
| 22 | 500 | 50 | 0.10 | 33 | 0.066 | 130 | 3 | 88 | 29 | 21 | 138 | 27.6 |
| 2 | 500 | 50 | 0.10 | 60 | 0.12 | 130 | 3 | 147 | 47 | 16 | 210 | 42.0 |
| 23 | 500 | 100 | 0.20 | 33 | 0.066 | 130 | 3 | 88 | 29 | 29 | 146 | 29.2 |
| 14 | 500 | 100 | 0.20 | 60 | 0.12 | 130 | 4 | 205 | 78 | 12 | 295 | 59.0 |
| 24 | 500 | 100 | 0.20 | 75 | 0.15 | 130 | 3 | 185 | 84 | 20 | 289 | 57.8 |
| 25 | 500 | 100 | 0.20 | 120 | 0.24 | 130 | 3 | 210 | 102 | 16 | 328 | 65.6 |

From the data in Table IV, it will be noted that yields increase with increase of formaldehyde-chlorobenzene ratio. However, utilization of the formaldehyde decreased with increased ratio. Generally, the formaldehyde to chlorobenzene weight ratio will be between about 0.08 and about 0.20, and preferably between about 0.10 and 0.15.

ACID STRENGTH

Examples 26 and 27

Using the standard run procedure, runs were made in which sulfuric acid catalysts of varying strength were used. Pertinent run data and yields, in comparison with data for Examples 13, are set forth in Table V.

TABLE V

| Example | Charge, grams | | | | | Temp., °C. | Time, hrs. | Yield, grams | | | | Yield, weight percent chlorobenzene |
|---|---|---|---|---|---|---|---|---|---|---|---|---|
| | Chlorobenzene | $H_2SO_4$ | Weight ratio | Paraform | Weight ratio | | | Cut 1 | Cut 2 | Residue | Total | |
| 13 | 500 | [1] 100 | 0.20 | 60 | 0.12 | 130 | 4 | 205 | 78 | 12 | 295 | 59.0 |
| 26 | 500 | [2] 100 | 0.20 | 60 | 0.12 | 130 | 3 | 188 | 66 | 12 | 266 | 53.2 |
| 27 | 500 | [3] 100 | 0.20 | 60 | 0.12 | 130 | 3 | 138 | 44 | 10 | 192 | 38.4 |

[1] 98% $H_2SO_4$.  [2] 94.3% $H_2SO_4$.  [3] 80.0% $H_2SO_4$.

From the data of Table V, it is noted that maximum conversion occurred using 98 weight percent sulfuric acid. When the acid strength was decreased, yield decreased, but even using 80 percent sulfuric acid was satisfactory. In general, the strength of the sulfuric acid catalyst can be between about 80 percent and about 100 percent. In preferred practice the acid strength should be between about 94 percent and about 100 percent.

INCREMENTAL ADDITION OF FORMALDEHYDE

In the standard run procedure, sulfuric acid was added to a mixture containing all the chlorobenzene and formaldehyde. If, however, the formaldehyde is added portionwise, i.e., by incremental addition, to a mixture of chlorobenzene and sulfuric acid catalyst definite yield increases can be realized. This is illustrated in the following example.

Example 28

A mixture of 500 grams of chlorobenzene and 100 grams (0.20 ratio) of 98 percent sulfuric acid catalyst were placed in a reaction vessel. During a reaction period of 3 hours, at 100° C., 60 grams (0.12 wt. ratio) paraformaldehyde were added in five 12-gram portions the addition being at one-half hour intervals. Separation of acid and the recovery of products were carried out as described in the standard run procedure. The pertinent run data and results, in comparison with Example 4, are set forth in Table VI.

Example 29

A run was made that was identical to that of Example 5, except that the formaldehyde was in the form of the cyclic trimer, trioxane. There was a conversion of 50.2 weight percent, as compared to 44 weight percent in Example 5. Dimer and trimer product yields were of the same order of magnitude.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for producing a polymer oil, that comprises reacting formaldehyde with chlorobenzene, in a weight ratio of formaldehyde to chlorobenzene varying between about 0.08 and about 0.2; in the presence of sulfuric acid catalyst, the acid strength of said sulfuric acid being at least 80 percent $H_2SO_4$ by weight, and the weight ratio of said sulfuric acid to chlorobenzene varying between about 0.1 and about 0.4; at a temperature varying between about 60° C. and about 130° C.; and for a period of time varying between about one hour and about six hours.

2. A process for producing a polymer oil, that comprises reacting formaldehyde with chlorobenzene, in a weight ratio of formaldehyde to chlorobenzene varying between about 0.1 and about 0.15; in the presence of sulfuric acid catalyst, the acid strength of said sulfuric acid being between about 94 percent and about 100 percent $H_2SO_4$ by weight, and the weight ratio of said sulfuric acid to chlorobenzene varying between about 0.1 and about 0.25; at a temperature varying between about 100° C. and about 130° C.; and for a period of time varying between about three hours and about six hours.

3. The process defined in claim 1 wherein said formaldehyde is added portionwise to said chlorobenzene and said sulfuric acid.

4. The process defined in claim 2 wherein said form-

TABLE VI

| Example | Charge, grams | | | | | Temp., °C. | Time, hrs. | Yield, grams | | | | Yield, weight percent chlorobenzene |
|---|---|---|---|---|---|---|---|---|---|---|---|---|
| | Chlorobenzene | $H_2SO_4$ | Weight ratio | Paraform | Weight ratio | | | Cut 1 | Cut 2 | Residue | Total | |
| 28 | 500 | 100 | 0.20 | [1] 60 | 0.12 | 100 | 3 | 214 | 52 | 64 | 330 | 66.0 |
| 4 | 500 | 100 | 0.20 | [2] 60 | 0.12 | 100 | 3 | 115 | 55 | 33 | 203 | 40.6 |

[1] Added in five 12 gram portions.  [2] Added in one portion using standard procedure.

It is to be noted that the conversion is increased by some 50 percent, when the process is carried out using incremental addition of formaldehye. There is, however, some increase in the amount of resinous polymer. In practice, the choice of method of reaction, whether "standard" or by incremental addition, will be governed by the desirability of greater conversion or of lower production of resinous products.

FORMALDEYDE

As has been mentioned hereinbefore, forms of formaldehyde other than paraformaldehyde can be used.

aldehyde is added portionwise to said chlorobenzene and said sulfuric acid.

References Cited in the file of this patent

UNITED STATES PATENTS

| | | |
|---|---|---|
| 2,548,982 | Kemp | Apr. 17, 1951 |
| 2,854,493 | Fetterly | Sept. 30, 1958 |
| 2,937,212 | Breier et al. | May 17, 1960 |

OTHER REFERENCES

Stephen et al.: J. Chem. Soc., 117, 518–9, (1920).